United States Patent
Keuten et al.

(10) Patent No.: US 10,088,369 B2
(45) Date of Patent: *Oct. 2, 2018

(54) ARRANGEMENT OF A TEMPERATURE SENSOR WITH AN ELECTRICALLY INSULATING COVERING

(71) Applicant: CONTI TEMIC MICROELECTRONIC GMBH, Nuremberg (DE)

(72) Inventors: Matthias Keuten, Altdorf (DE); Andreas Voegerl, Parsberg (DE); Juergen Henniger, Erlangen-Dechsendorf (DE); Matthias Wieczorek, Neunkirchen am Sand (DE); Lisa-Maria Wittmann, Alesheim (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 228 days.

This patent is subject to a terminal disclaimer.

(21) Appl. No.: 15/023,733

(22) PCT Filed: Sep. 12, 2014

(86) PCT No.: PCT/EP2014/069510
§ 371 (c)(1),
(2) Date: Mar. 22, 2016

(87) PCT Pub. No.: WO2015/039966
PCT Pub. Date: Mar. 26, 2015

(65) Prior Publication Data
US 2016/0231183 A1   Aug. 11, 2016

(30) Foreign Application Priority Data

Sep. 23, 2013 (DE) .................. 10 2013 219 092

(51) Int. Cl.
*G01K 7/00* (2006.01)
*G01K 7/22* (2006.01)
(Continued)

(52) U.S. Cl.
CPC .................. *G01K 7/22* (2013.01); *G01K 1/08* (2013.01); *G01K 1/16* (2013.01); *G01K 7/16* (2013.01); *G01K 2205/00* (2013.01)

(58) Field of Classification Search
CPC .. G01K 7/22; G01K 1/08; G01K 1/16; G01K 7/16; G01K 2205/00
(Continued)

(56) References Cited

U.S. PATENT DOCUMENTS 4,142,170 A    2/1979  Blatter
4,246,787 A *  1/1981  Harper .................... G01K 1/18
                                                    29/612
(Continued)

FOREIGN PATENT DOCUMENTS

DE    3044419 A1    6/1982
DE    4108789 A1    7/1992
(Continued)

*Primary Examiner* — Lisa Caputo
*Assistant Examiner* — Janice M Soto
(74) *Attorney, Agent, or Firm* — Laurence A. Greenberg; Werner H. Stemer; Ralph E. Locher

(57) ABSTRACT

A sensor arrangement for measuring the temperature of a medium in a motor vehicle. The sensor has a sensor body and two connecting wires and is completely insulated from the medium. The sensor body is electrically insulated by the medium by way of a covering completely surrounding the sensor body, and is in heat-conducting contact with the medium by way of the connecting wires and the surrounding covering.

9 Claims, 2 Drawing Sheets

(51) Int. Cl.
*G01K 1/08* (2006.01)
*G01K 1/16* (2006.01)
*G01K 7/16* (2006.01)

(58) Field of Classification Search
USPC ....... 374/116, 208, 144, 143, 148, 185, 183, 374/115
See application file for complete search history.

(56) References Cited

U.S. PATENT DOCUMENTS

| | | |
|---|---|---|
| 4,420,738 A | 12/1983 | Rehmann et al. |
| 4,516,106 A * | 5/1985 | Nolting ................... G01K 1/18 338/28 |
| 6,365,424 B1 * | 4/2002 | Bauer .................. G01D 11/245 257/690 |
| 7,046,116 B2 | 5/2006 | Damaschke et al. |
| 7,798,704 B2 * | 9/2010 | Bard ........................ G01K 3/06 374/116 |
| 2004/0101031 A1 * | 5/2004 | Kotwicki .................. G01K 1/16 374/185 |
| 2004/0264544 A1 * | 12/2004 | Fischer .................... G01K 7/16 374/208 |

FOREIGN PATENT DOCUMENTS

| | | |
|---|---|---|
| DE | 4339631 A1 | 12/1994 |
| DE | 9218936 U1 | 7/1996 |
| DE | 10052116 A1 | 5/2002 |
| DE | 10322166 A1 | 5/2004 |
| DE | 102010002806 A1 | 9/2011 |
| JP | S5226250 A | 2/1977 |
| JP | S5499483 A | 8/1979 |
| JP | S57116229 | 7/1982 |
| JP | 2009526976 A | 7/2009 |

* cited by examiner

ARRANGEMENT OF A TEMPERATURE SENSOR WITH AN ELECTRICALLY INSULATING COVERING

BACKGROUND OF THE INVENTION

Field of the Invention:

The invention relates to a sensor arrangement with a sensor body and two connection wires, for measuring the temperature of a medium in a motor vehicle, wherein the sensor body is electrically insulated from the medium by means of a covering which completely surrounds the sensor body.

Temperature sensors, in particular for measuring the temperature of media, such as oil or cooling liquid in a motor vehicle, generally change their electrical properties depending on the prevailing temperature. For example, when a sensor component which is composed of carbon or a semiconductor material is heated, the electrical resistance of said sensor component falls. Therefore, the temperature can be determined fairly accurately by measuring the resistance in the region of the large increase. Materials of this kind conduct the current better when they are hot than when they are cold, and are therefore also called NTC (Negative Temperature Coefficient) thermistors. Metals, such as platinum for example, exhibit the opposite effect and are therefore called PTC (Positive Temperature Coefficient) thermistors.

The sensor resistor, which is directly surrounded by medium, is generally connected to a supply voltage by way of its two connections which can be designed as pins or legs. The voltage which is dropped across one sensor resistor is determined and evaluated in a controller.

Heat can be introduced from the medium to the sensor by means of the two connection legs and at the same time by means of the side faces of the sensor module. In this case, that area of the arrangement which transmits heat is large, and therefore the response time of the measurement process is short. However, the risk of a short circuit between the connection legs is high, in particular owing to chips as can quite possibly be produced in a motor or a transmission by friction between the rotating parts.

BRIEF SUMMARY OF THE INVENTION

An object of the present invention is therefore to provide a sensor arrangement for measuring the temperature of a medium in a motor vehicle of the kind cited in the introductory part in such a way that as short as possible a response time is guaranteed together with increased protection against short circuits.

According to the invention, this object is achieved by an arrangement having the features as claimed.

The sensor arrangement according to the invention substantially comprises a sensor body and connection wires, wherein the sensor body is electrically insulated from the medium by means of a covering which completely surrounds the sensor body, and the sensor is in thermally conductive contact with the medium by means of the connection wires and the surrounding covering. As a result, the introduction of heat from the medium to the sensor and hence the response time of the sensor during the temperature measurement is significantly increased compared to a sensor with an electrically and thermally insulating covering. The covering necessarily also surrounds the connection wires to a great extent, at least in the region of the sensor body, as a result of which the risk of a short circuit between the connection wires, in particular owing to metal chips in the medium, is considerably reduced. The sensor signal can be tapped off from the connection wires which are held in an isolated manner in this way and are supplied to an evaluation unit, in particular to a controller, for evaluation purposes.

The covering is composed, in particular, of an electrically insulating and thermally conductive material, such as a thermosetting plastic or a thermoplastic for example with fillers such as quartz or aluminum powders. The addition of fillers of this kind may lead to a thermal conductivity of up to 10 W/m K (watt/meter Kelvin), compared to 0.2 to 0.5 W/m K without fillers.

Each connection wire is advantageously electrically conductively connected to a contact base, from which the sensor signal can be tapped off, by means of a separate connection contact. The connection contact can be designed, in particular, as a stamped grid.

In order to further improve the response time of the measurement method, that surface of the arrangement which comes into thermally conductive contact with the medium can, in particular, be increased in size by at least one part of at least one connection contact not being surrounded by the covering, and therefore coming into direct thermally conductive contact with the medium.

That surface of the arrangement which comes into thermally conductive contact with the medium can be increased in size, and therefore the response time can be further shortened, in particular by the connection contact establishing thermal contact with the medium by means of an additional apparatus. In particular, the contact surface of the apparatus, which surface is not surrounded by the covering and is therefore in direct thermally conductive contact with the medium, is larger than the contact surface of the connection contact with the medium in this case. For the sake of simplicity, the apparatus can be a part of the connection contact in each case, for example can be integrated into a stamped grid.

The covering can particularly be designed as an encapsulation, a casting or a multipartite housing, for example comprising a cover and a housing lower part.

Depending on the field of use, the sensor can be designed as an NTC (Negative Temperature Coefficient) thermistor, for example which is composed of carbon or a semiconductor material, with a negative temperature coefficient, or as a PTC (Positive Temperature Coefficient) thermistor, in particular which is composed of metal, with a positive temperature coefficient.

BRIEF DESCRIPTION OF THE SEVERAL VIEWS OF THE DRAWING

The present invention is described in more detail with reference to the attached drawings, in which.

DESCRIPTION OF THE INVENTION

Figure 1:
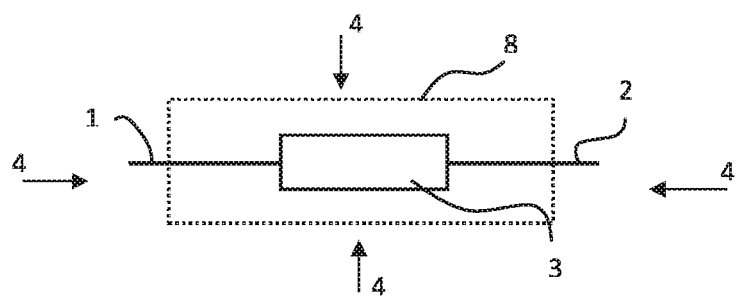
FIG. 1 shows a front view of the arrangement.

FIG. 1 shows a sensor arrangement for measuring the temperature of a medium 4 in a motor vehicle, wherein the sensor comprises a sensor body 3 and two connection wires 1, 2. The sensor body 3 is electrically insulated from the surrounding medium 4 by means of a covering 8 which completely surrounds the sensor body 3. The sensor body is in thermally conductive contact with the medium 4 by means of the connection wires 1, 2 and the surrounding covering 8.

As a result, the response time is significantly increased in relation to a sensor with an electrically and thermally insulating covering 8. The covering 8 necessarily also surrounds the connection wires 1, 2 to a great extent, at least in the region of the sensor body 3, as a result of which the risk of a short circuit between the connection wires 1, 2 is considerably reduced. The sensor signal can be tapped off from the connection wires 1, 2 which are held in an isolated manner in this way and can be supplied to an evaluation unit, in particular to a controller, for evaluation purposes.

The covering 8 is composed in particular, as already described above, of an electrically insulating and thermally conductive material such as a thermosetting plastic or a thermoplastic for example. The addition of fillers such as quartz or aluminum powders may lead to a thermal conductivity of up to 10 W/m K (watt/meter Kelvin), compared to 0.2 to 0.5 W/m K of coverings of this kind without fillers.

Figure 2:
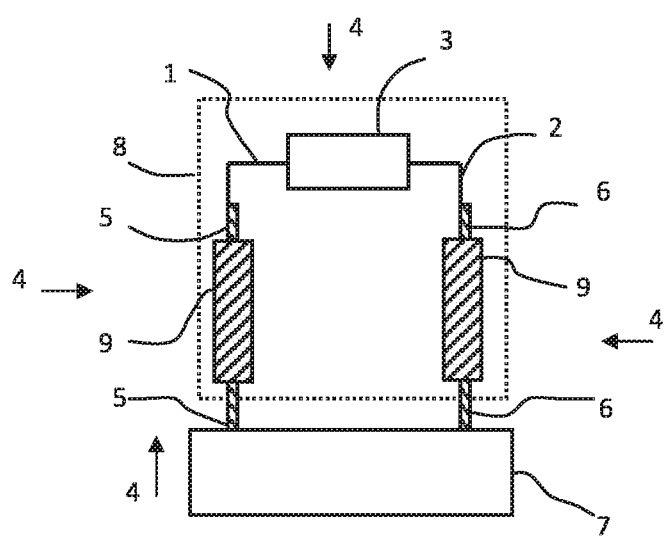
FIG. 2 is a sectional illustration through the arrangement.

FIG. 2 shows a section through the arrangement. Each connection wire 1, 2 is electrically conductively connected to a contact base 7 by means of a separate connection contact 5, 6, wherein the sensor body 3, the connection wires 1, 2 and the associated connection contacts 5, 6 are virtually completely surrounded by the covering 8, and as a result are both thermally and electrically insulated from the medium 4. The connection contacts 5, 6 are designed as stamped grids for example. A sensor signal can be tapped off from the contact base 7.

The risk of a short circuit between the connection wires 1, 2 or between the connection contacts 5, 6, in particular owing to chips as are often produced in a motor or a transmission by friction between the rotating parts, is kept low by virtue of this arrangement.

The connection contacts 5, 6 in FIG. 2 are each in electrically and thermally conductive contact with an apparatus 9 which, for the sake of simplicity, is part of the connection contact 5, 6.

Figure 4:
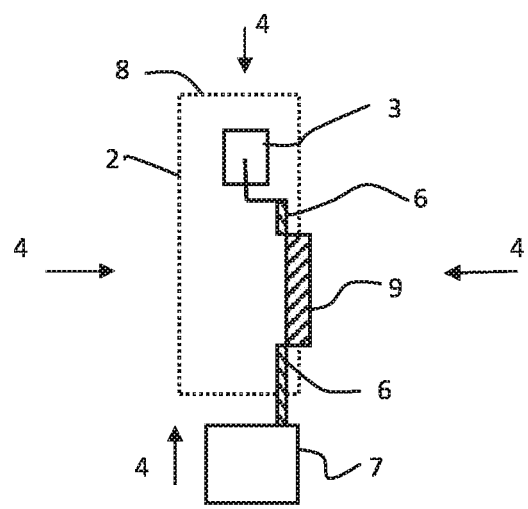
FIG. 4 shows a side view of the arrangement.

FIG. 4 shows a side view of the arrangement. In this case, at least one part of the apparatus 9 is not surrounded by the covering and is therefore in direct thermally conductive contact with the medium 4. Since the contact surface of the apparatus 9, which contact surface is free of the covering 8 and is therefore in direct thermally conductive contact with the medium 4, is larger than the contact surface of the connection contact 5, 6 with the medium 4, the area of the arrangement which transmits heat is relatively large. This leads to a relatively short response time of the measurement process. As a result, rapid temperature fluctuations in the medium 4 can also be detected.

Figure 3:
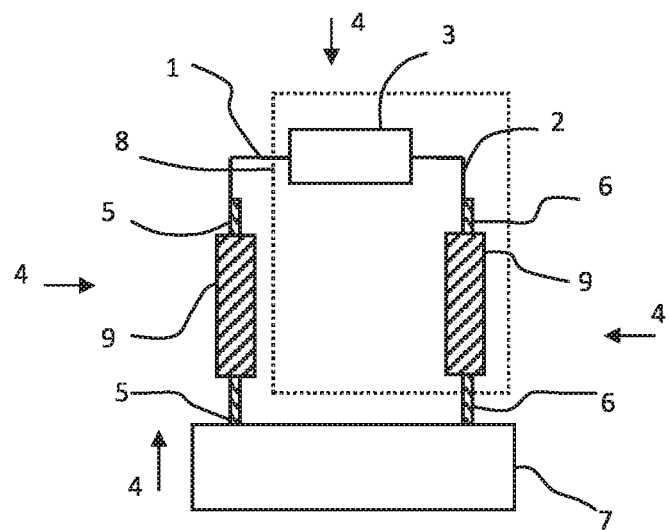
FIG. 3 is a further sectional illustration through the arrangement.

The response time of the measurement process is further reduced by the arrangement in FIG. 3. Since a large part of one of the connection wires 1 and the associated connection contact 5, including the associated apparatus 9, are free of the covering 8, the thermally conductive contact surface of the arrangement 6 with the medium 4 is further increased together with protection against short circuits.

The invention claimed is:

1. A sensor arrangement for measuring a temperature of a medium in a motor vehicle, the sensor arrangement comprising:
   a sensor body and two connection wires connected to said sensor body;
   a covering electrically insulating said sensor from the medium, said covering completely surrounding said sensor body;
   said sensor body being in thermally conductive contact with the medium by way of said connection wires and said surrounding covering;
   a contact base electrically conductively connected to each connection wire by way of a separate connection contact, said contact base being configured to carry a sensor signal; and
   wherein at least a part of one said connection contact is not surrounded by said covering, and is therefore in direct thermally conductive contact with the medium.

2. The sensor arrangement according to claim 1, wherein said covering is an electrically insulating covering composed of a material selected from the group consisting of a thermosetting plastic or a thermoplastic with fillers for increasing a thermal conductivity.

3. The sensor arrangement according to claim 2, wherein said fillers are quartz or aluminum powders.

4. The sensor arrangement according to claim 1, wherein said connection contacts are formed as stamped grids.

5. The sensor arrangement according to claim 1, which comprises an apparatus for establishing contact of said connection contact with the medium, said apparatus having a contact surface that is not surrounded by said covering and is therefore in direct thermally conductive contact with the medium (4), said contact surface of said apparatus being larger than a contact surface of said connection contact.

6. The sensor arrangement according to claim 5, wherein said apparatus is a part of said connection contact in each case.

7. The sensor arrangement according to claim 1, wherein said covering is an element selected from the group consisting of an encapsulation, a casting, and a multipartite housing.

8. The sensor arrangement according to claim 1, wherein said sensor is a resistor with a negative temperature coefficient.

9. The sensor arrangement according to claim 1, wherein said sensor is a resistor with a positive temperature coefficient.

* * * * *